: US 11,048,675 B2
(45) Date of Patent: Jun. 29, 2021

(54) STRUCTURED DATA ENRICHMENT (71) Applicant: EMC IP Holding Company LLC, Hopkinton, MA (US)

(72) Inventors: Anatoly Gendelev, Rehovot (IL); Sigal Shapira, Arad (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 16/263,078

(22) Filed: Jan. 31, 2019

(65) Prior Publication Data

US 2020/0250157 A1 Aug. 6, 2020

(51) Int. Cl.
*G06F 16/215* (2019.01)
*G06F 16/21* (2019.01)
*G06F 16/28* (2019.01)
*G06F 40/14* (2020.01)
*G06F 40/205* (2020.01)

(52) U.S. Cl.
CPC ......... *G06F 16/215* (2019.01); *G06F 16/211* (2019.01); *G06F 16/284* (2019.01); *G06F 40/14* (2020.01); *G06F 40/205* (2020.01)

(58) Field of Classification Search
CPC ........ G06N 20/00; G06N 3/08; G06F 16/116; G06F 40/117; G06F 16/83; G06F 40/194; G06F 16/215; G06F 16/211; G06F 16/284; G06F 40/14
See application file for complete search history.

(56) References Cited

U.S. PATENT DOCUMENTS

| | | | |
|---|---|---|---|
| 9,122,720 B2 | 9/2015 | Bice et al. | |
| 9,122,721 B2 | 9/2015 | Bice et al. | |
| 9,128,979 B2 | 9/2015 | Bice et al. | |
| 9,633,110 B2 | 4/2017 | Mendelovich et al. | |
| 10,140,366 B2 | 11/2018 | Platt et al. | |
| 2005/0060647 A1* | 3/2005 | Doan | G06F 16/248 |
| | | | 715/205 |
| 2015/0134685 A1 | 5/2015 | Sekharan | |
| 2017/0289166 A1* | 10/2017 | Self | G06F 16/116 |
| 2018/0060537 A1* | 3/2018 | Tiwari | G06F 16/221 |
| 2018/0181632 A1* | 6/2018 | Zarum | G06F 16/215 |
| 2018/0349350 A1* | 12/2018 | Zhu | G06F 40/284 |
| 2019/0042551 A1* | 2/2019 | Hwang | G06F 40/216 |
| 2019/0361960 A9* | 11/2019 | Weinreb | G06F 40/117 |
| 2020/0167420 A1* | 5/2020 | Yin | G06F 40/35 |

* cited by examiner

*Primary Examiner* — Etienne P Leroux
(74) *Attorney, Agent, or Firm* — Ryan, Mason & Lewis, LLP (57) ABSTRACT

Methods, apparatus, and processor-readable storage media for enriching structured data are provided herein. An example method includes receiving a first data structure and a second data structure; normalizing the first data structure and the second data structure using one or more configuration files; identifying, from the normalized first data structure and second data structure, one or more items of data in the second data structure that contain information relevant to one or more items of corresponding data in the first data structure; and generating a target data structure comprising at least a portion of the one or more items of identified data from the second data structure, at least a portion of the one or more items of corresponding data from the first data structure, and a unique key corresponding to the portions of the one or more items of data from the first and second data structures.

20 Claims, 6 Drawing Sheets

| | EVENT_ID | VERSION | PREL_SCORE | RISK_SCORE | RISK_1_CONTR | RISK_1_SCORE |
|---|---|---|---|---|---|---|
| 302 | 6720170515115614 | 300 | −6935 | 8 | webDeviceAge | −1879 |
| | 6720170515120816 | 300 | −6199 | 30 | mobileDevAge | −1710 |

FIG. 3B

| webDevAge | user_age<br>col_l_23 | 1..10=1<br>11..20=11<br>21..30=21<br>31..40=31<br>41..50=41<br>51..100=51<br>101..150=101<br>151..999999999=151 |
|---|---|---|
| | user_dev_age<br>col_l_148 | 1..5=1<br>6..10=6<br>11..20=11<br>21..30=21<br>31..40=31<br>41..50=41<br>51..80=51<br>81..120=81<br>121..999999999=121 |

FIG. 4

| EVENT_ID | VERSION | PREL_SCORE | RISK_SCORE | RISK_1_CONTR | RISK_1_SCORE | BUCKET_1_AFTER_MAPPING | BUCKET_1_AFTER_MAPPING | FACTS | FIELDS |
|---|---|---|---|---|---|---|---|---|---|
| 67201705151115614 | 300 | −6935 | 8 | webDeviceAge | −1879 | 151;121 | 1953;1098 | user.days_since_first_hit, user.webDevice.daysSinceFirstHit | DATA_L_23;DATA_L_148 |
| 67201705151120816 | 300 | −6199 | 30 | mobileDevAge | −1710 | 51;31 | 63;36 | user.days_since_first_hit, user.mobileDevice.daysSinceFirstHit | DATA_L_23;DATA_L_154 |

STRUCTURED DATA ENRICHMENT

FIELD

The field relates generally to information processing systems, and more particularly to techniques for data processing using such systems.

BACKGROUND

Data management is increasingly important to businesses. For example, while there is often useful and relevant data generated and managed internally by a business, such data are often generated and managed for internal purposes by different groups within the business. Accordingly, different sets of data (such as third-party data and different datasets managed by different groups within a business) may not be shared with other users or groups because, for example, such data are stored in different formats.

SUMMARY

Illustrative embodiments provide techniques for enriching structured data. An exemplary computer-implemented method includes receiving a first data structure and a second data structure, and normalizing the first data structure and the second data structure using one or more configuration files. Such a method also includes identifying, from the normalized first data structure and second data structure using machine learning, one or more items of data in the second data structure that contain information relevant to one or more items of corresponding data in the first data structure. Further, such a method includes generating a target data structure comprising at least a portion of the one or more items of identified data from the second data structure, at least a portion of the one or more items of corresponding data from the first data structure, and a unique key corresponding to the portions of the one or more items of data from the first and second data structures.

Illustrative embodiments can provide significant advantages relative to conventional data management and analysis techniques, such as enhanced analytical capabilities, improved user experience, improved resource allocation efficiency, etc. For example, challenges associated with utilizing different sets of data (such as business-related data, for example) when the sets of data are structured differently are overcome by automatically combining the sets of data into a common data format.

These and other illustrative embodiments described herein include, without limitation, methods, apparatus, systems, and computer program products comprising processor-readable storage media.

DETAILED DESCRIPTION

Illustrative embodiments of the disclosure will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
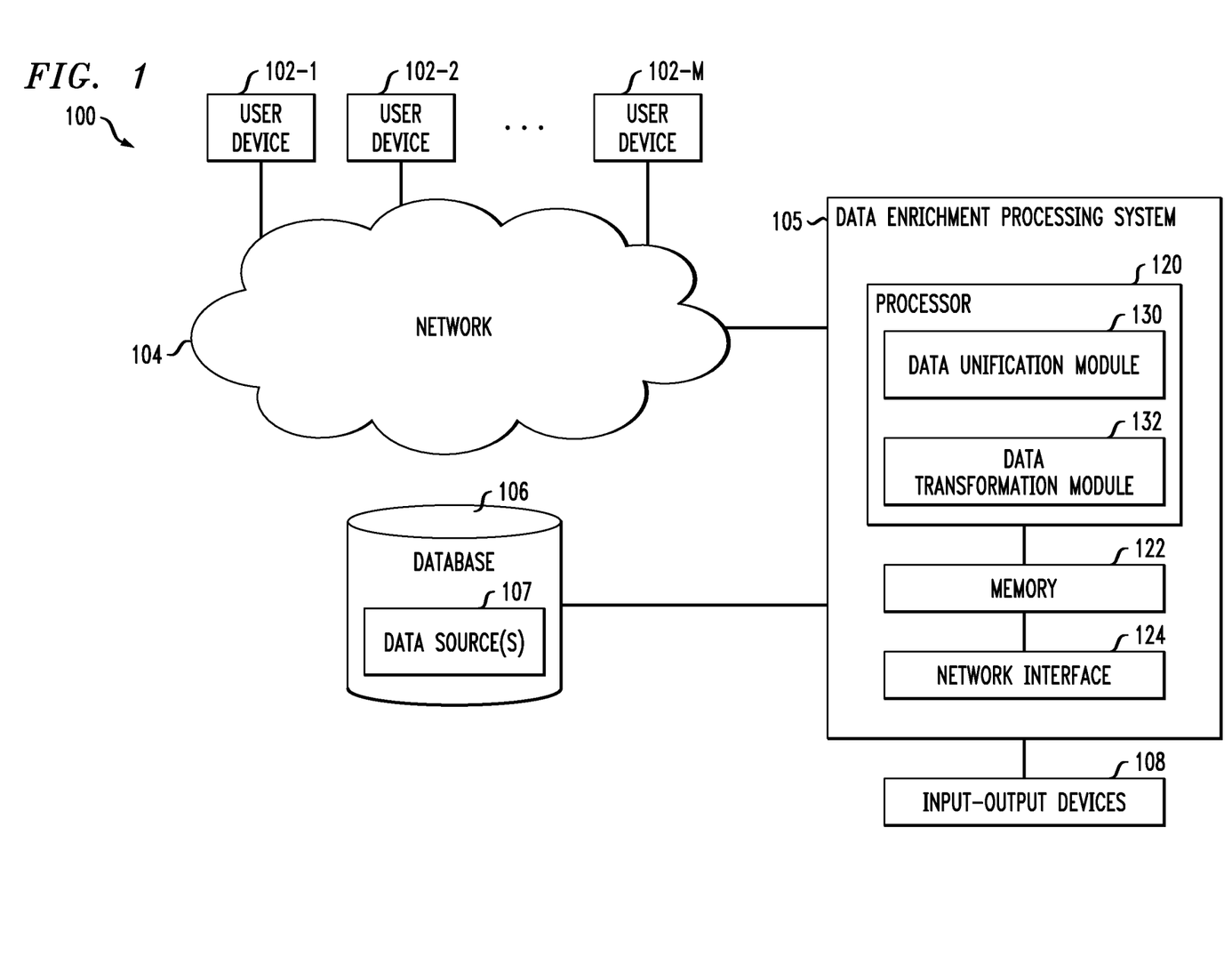
FIG. 1 shows is a system architecture configured for enriching data structures in an illustrative embodiment.

FIG. 1 shows a computer network (also referred to herein as an information processing system) 100 configured in accordance with an illustrative embodiment. The computer network 100 comprises a plurality of user devices 102-1, 102-2 . . . 102-M, collectively referred to herein as user devices 102. The user devices 102 are coupled to a network 104, wherein the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to the network 104 is a data enrichment processing system 105.

The user devices 102 may comprise, for example, mobile telephones, laptop computers, tablet computers, desktop computers or other types of computing devices. Such devices are examples of what are more generally referred to herein as "processing devices" or "computing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the data enrichment processing system 105 (and/or one or more of the user devices 102) can have an associated database 106 configured to store data 107, which may comprise, for example, two or more sets of data with different structures (or formats). For example, the two or more sets data may correspond to different data sources. In at least one embodiment, each of the two or more sets of data may correspond to data from different departments within an organization, for example.

The database 106 in the present embodiment is implemented using one or more storage systems associated with the data enrichment processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data enrichment processing system 105 are input-output devices 108, which illustratively comprise keyboards, displays or other types of input-output devices in any combination. Such input-output devices can be used, for example, to support one or more user interfaces to the data enrichment processing system 105, as well as to support communication between the data enrichment processing system 105 and other related systems and devices not explicitly shown.

The data enrichment processing system 105 in the FIG. 1 embodiment is assumed to be implemented using at least one processing device. Each such processing device generally comprises at least one processor and an associated memory, and implements one or more functional modules for controlling certain features of the data enrichment processing system 105.

More particularly, the data enrichment processing system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the data enrichment processing system 105 to communicate over the network 104 with the user devices 102, and illustratively comprises one or more transceivers.

The processor 120 further comprises a data unification module 130 and a data transformation module 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be combined into a single module, or separated across a larger number of modules. As another example, multiple distinct processors can be used to implement different ones of the modules 130 and 132 or portions thereof.

At least portions of the data unification module 130 and data transformation module 132 may be implemented at least in part in the form of software that is stored in memory 122 and executed by processor 120.

It is to be understood that the particular set of elements shown in FIG. 1 for structured data enrichment involving data enrichment processing system 105 and user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the data enrichment processing system 105 can be eliminated and associated elements such as data unification module 130 and data transformation module 132 can be implemented elsewhere in the computer network 100.

An exemplary process utilizing data unification module 130 and data transformation module 132 of the data enrichment processing system 105 in computer network 100 will be described in more detail with reference to the flow diagram of FIG. 5.

As noted herein, the data enrichment processing system 105 may represent a portable device, such as a mobile telephone, personal digital assistant (PDA), wireless email device, game console, etc. The data enrichment processing system 105 may alternatively represent a desktop or laptop personal computer (PC), a microcomputer, a workstation, a mainframe computer, a wired telephone, a television set top box, or any other information processing device which can benefit from the use of enriched structured data techniques in accordance with the invention.

Figure 2:
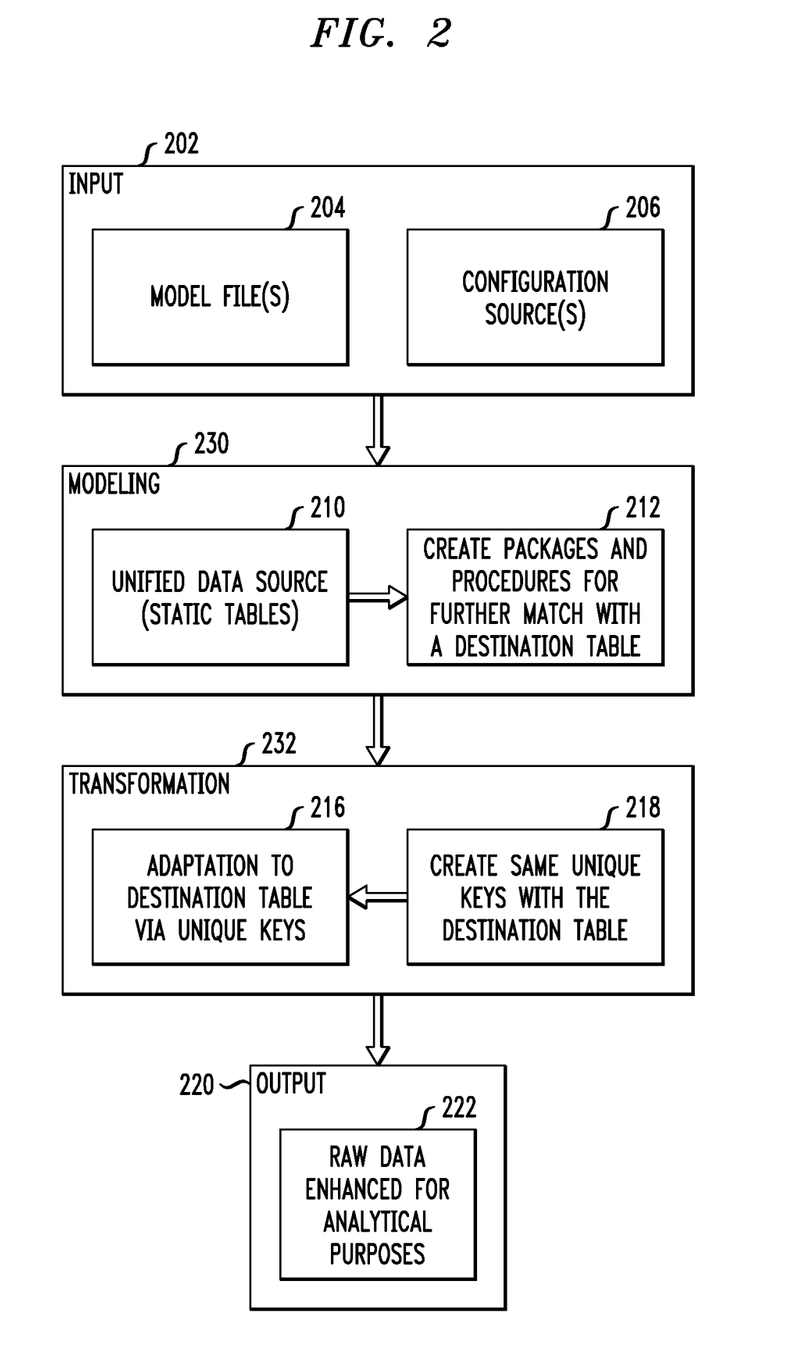
FIG. 2 shows an example flow diagram in accordance with the subject matter described herein.

Referring now to FIG. 2, this figure shows a high-level flow diagram in accordance with exemplary embodiments. As depicted in FIG. 2, a system (for example, data enrichment processing system 105) receives input in the form of model files 204 (such as extensible markup language (XML) files, for example) and one or more configuration files 206. The model files 204 may include, for example, sets of data that are structured (or formatted) differently, and the configuration file(s) 206 may comprise code that enables the system to parse the model files 204.

The model files 204 and configuration files 206 are used to model the data as indicated by component 230. The modeling component 230 includes parsing the model files 204 to generate a unified data source as indicated by block 210. The parsing may include, for example, applying a predefined set of parameters which describe data (for example, data within the model files 204) stored in different formats such that the data will have a common base format after the parsing. Additionally, the modeling component 230 includes linking the different data in the unified data source, such as by creating packages and procedures for matching the different data within a destination table, as indicated by component 212. The destination table may include, for example, all of the data from the different model files 204. Alternatively, the destination table may include less than all of the data in the model files 204, such as, for example, only a portion of data from one or more of the model files 204, as defined by, for example, the created packages or procedures in component 212.

The data are transformed to generate a destination table, as indicated by component 232. More specifically, via component 218, a same unique key is created in the destination table for data that was linked between two or more sets of data in the modeling component 230. In some instances, the unique key corresponds to a key that is common to all of the sources of data. In other instances, the different sources of data may not have the same key, in which case a unique identifier can be created in the destination table. As a non-limiting example, assume a first data source has a common key with a second data source, but not the same key as a third data source, while the second data source has a common key with the third data source. In this example, a unique identifier can be created using pairs of the keys such that data from all three sources can be combined and unified on a unique basis. In other words, a unique key allows, for example, items of linked data from the different sources to be presented as single transactions in the destination table.

The data from the unified data source are adapted to the destination table based on the unique keys, as indicated by component 216. At least some of the data from the destination table may then be output via component 220. For example, the data may be output as raw data enhanced for analytical purposes, as indicated by component 222.

It is noted that the modeling component 230 and the transformation component 232 in FIG. 2 may correspond to, for example, functions performed by the data unification module 130 and the data transformation module 132, respectively.

Additionally, in one or more embodiments, the model files 204 may include two or more files. The files may be any suitable format for storing data, including, for example, XML, files, Python files, SQL files, R files, other open source formats, etc. Each file may include relevant data managed by a different source (for example, different departments, teams, companies, users, etc.). For instance, an enterprise may include a service department that internally manages a first set of data that is structured or stored in a particular way. The enterprise may also include a product development department that internally manages a second set of data that is structured differently than the data managed by the service department (such as being stored in a different format, for example). As such, the different sets of data cannot be easily shared or accessed between the two departments for technical reasons, even though sharing such data may be valuable or relevant from a business perspective.

By way of example, consider a risk engine that analyzes a number of factors associated with a particular online activity to determine a probability of whether that activity is risky or potentially fraudulent. The risk engine model may be an organized hierarchical data model with groups that hold tens of different categories that are split by relevant elements within each category. In at least one embodiment, such a model is dynamic based on a continuous Bayesian self-learning algorithm. To maintain the model, various procedures are used to recalculate the values corresponding to each category. For analytic purposes, the output of the risk engine can include a structured table that organizes the bottom lines of these recalculated values by relevant features. Such a large-scale table presents raw data for each transaction and holds the final calculated values. However, a user (for example, an analyst) typically cannot rely on this data source (i.e., the large-scale table) by itself. Rather, the analyst also uses additional data sources to perform a data investigation.

Figure 3A:
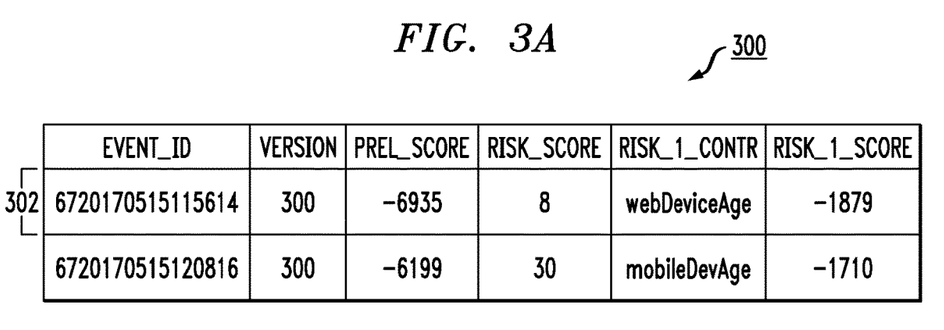
FIG. 3A shows an example of data from a first data source.

Referring to FIG. 3A, this figure shows a table 300 representing a large-scale database of a risk engine. Different transactions (i.e., events) are represented by each record in table 300 (for example, record 302). The table 300 includes calculated 'risk scores' representing the risk level of the activity. For example, record 302 relates to a login event that was processed by the risk engine to have a risk score (i.e., RISK_SCORE) of 8. This score is the outcome of multiple contributing score factors (for example, RISK_1_CONTR, RISK_2_CONTR . . . RISK_X_CONTR). For ease of understanding, table 300 only shows one of these factors, i.e., RISK_1_CONTR, which corresponds to a webDevAge and has a calculated value of −1879, as indicated by the RISK_1_SCORE for record 302.

Figure 3B:
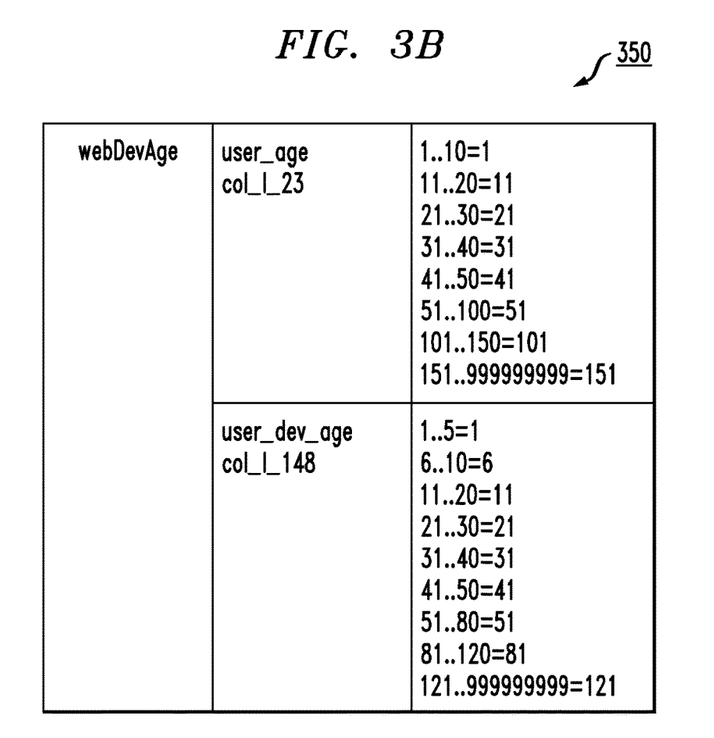
FIG. 3B shows related data from a separate data source in an illustrative embodiment.

Referring to FIG. 3B, this figure shows a table 350 from a separate data source that includes data related to the 'webDevAge' contributor from table 300. In particular, the webDevAge contributor from table 300 includes two elements: 'user_age' and 'user_device_age'. As indicated by table 350, the value of each of these elements is represented in columns' col_I_23 and col_I_148, respectively. Since the RISK_1_CONTR score has been dynamically calculated based on the correlation of these two elements, a clear understanding of values mapping within element scores is needed. Dynamic re-calculation maps values into an element, as indicated by the right-most column in table 350. Having the information from table 350 allows, for example, a user to determine why the RISK_1_SCORE was calculated as −1879 points.

Figure 4:
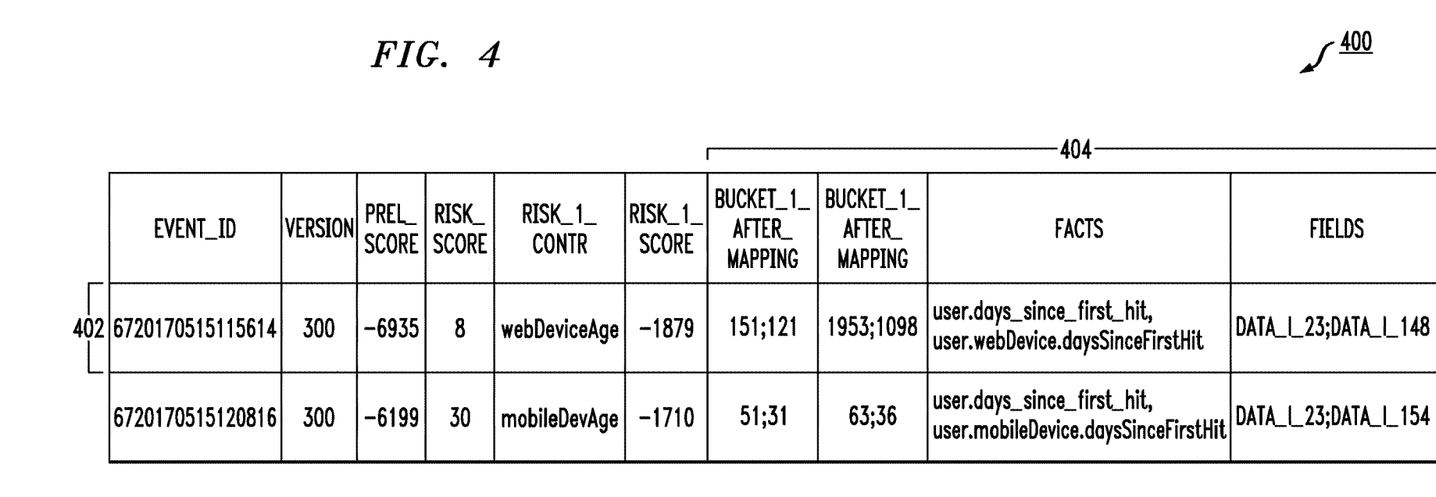
FIG. 4 shows an enhanced data structure in accordance with an illustrative embodiment.

Referring to FIG. 4, this figure shows an enhanced data structure 400 in accordance with an illustrative embodiment. The enhanced data structure 400 includes well-structured, relevant information for each transaction of data, which may be utilized by various users according to need and/or request. In the FIG. 4 example, the enhanced data structure 400 includes additional information relative to the table 300, as represented by columns 404. For example, record 402 includes the information from record 302 and, additionally, values for the elements before and after the mappings, relevant facts and relevant fields. In some embodiments, for example, the additional information is added by an extract-transform-load (ETL) process to the raw data table.

According to at least one embodiment, an enhanced data structure (such as enhanced data structure 400) may be created based on a selection or identification of, for example, data from a first data source (such as table 300, for example). For instance, a user may select (for example, via user input) RISK_1_CONTR in table 300, and the enhanced data structure 400 may be created so as to include the additional information in columns 404 based at least in part on that selection.

In some example embodiments, selecting data in a data source and/or identifying relevant data in other data sources is performed automatically using machine learning. For instance, machine learning may be used to determine that 'user_age' and 'user_device_age' from table 350 are associated with webDevAge from table 300. By way of additional example, data tables 300 and 350 may be parsed (as mentioned above with respect to FIG. 2) and the associations between the data may be determined based on a similarity between word representations (e.g., vector representations) corresponding to the parsed data (such as, for example, vector representations of 'user_age,' 'user_device_age' and 'webDevAge'). In some instances, machine learning algorithms can be applied to search databases and to create links between fields of a source table(s) and files based on free text and/or key words, such as for text data or picture data, for example.

FIG. 3A, FIG. 3B, and FIG. 4 are described with respect to a risk engine model, however, it is to be appreciated that this is not intended to be limiting. The techniques described herein are equally applicable to any use case wherein there is a need to combine data that is structured in different formats into an enhanced format, such as online businesses (insurance, banking, etc.) having transactional data, for example.

Figure 5:
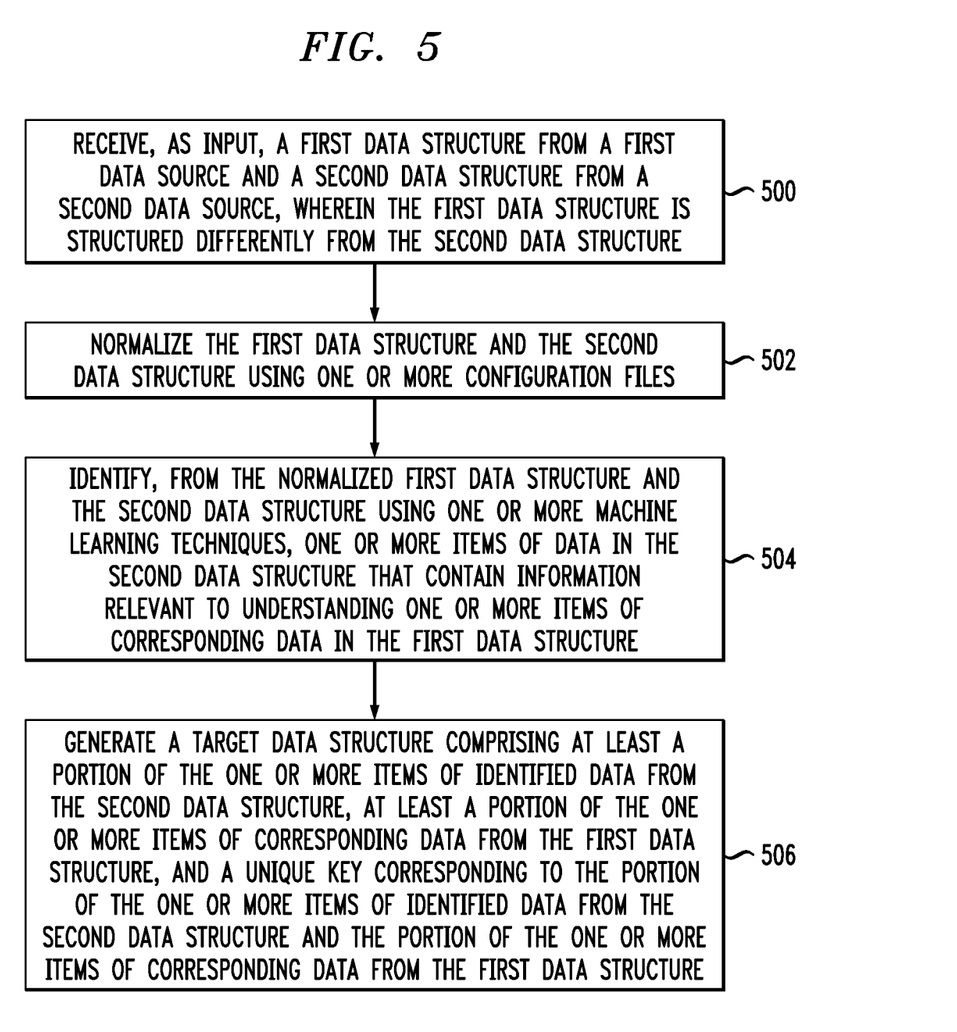
FIG. 5 is a flow diagram of a process for enriching data structures in an illustrative embodiment.

FIG. 5 is a flow diagram of a process for structured data enrichment in an illustrative embodiment. It is to be understood that this particular process is only an example, and additional or alternative processes can be carried out in other embodiments.

In this embodiment, the process includes steps 500 through 506. These steps are assumed to be performed by the processor 120 utilizing its modules 130 and 132.

Step 500 includes receiving, as input, a first data structure from a first data source and a second data structure from a second data source, wherein the first data structure is structured differently from the second data structure. Additionally, at least one of the first data structure and the second data structure may be received as an extensible markup language file.

Step 502 includes normalizing the first data structure and the second data structure using one or more configuration files. The one or more configuration files may include one or more rules for parsing the first data structure and the second data structure. Normalizing the first data structure and the second data structure may include parsing each of the first data structure and the second data structure by applying the one or more rules.

Step 504 includes identifying, from the normalized first data structure and the second data structure using machine learning, one or more items of data in the second data structure that contain information relevant to one or more items of corresponding data in the first data structure. The one or more items in the first data structure may include one or more dynamically calculated values, and the identified one or more items in the second data structure may include information indicative of how the one or more dynamically calculated values are calculated. Additionally, the identified one or more items in the second data structure may not be explicitly present in the first data structure.

Step 506 includes generating a target data structure comprising at least a portion of the one or more items of identified data from the second data structure, at least a portion of the one or more items of corresponding data from the first data structure, and a unique key corresponding to the portion of the one or more items of identified data from the second data structure and the portion of the one or more items of corresponding data from the first data structure.

According to at least one embodiment, the process in FIG. 5 may include a step of accessing, via the target data structure, the portion of the one or more items of identified data from the second data structure and the portion of the one or more items of corresponding data from the first data structure using the unique key. The step of accessing may further include causing the portion of the one or more items of identified data from the second data structure to be displayed within a user interface with the portion of the one or more items of corresponding data from the first data structure.

Accordingly, the particular processing operations and other functionality described in conjunction with the flow diagram of FIG. 5 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically combine data structured in different formats into a common, readable form. Some embodiments are configured to use machine learning to identify data from one or more data sources to enhance data from a given data source. These and other embodiments can provide enhanced analytical capabilities, improved user experience, improved resource allocation efficiency, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
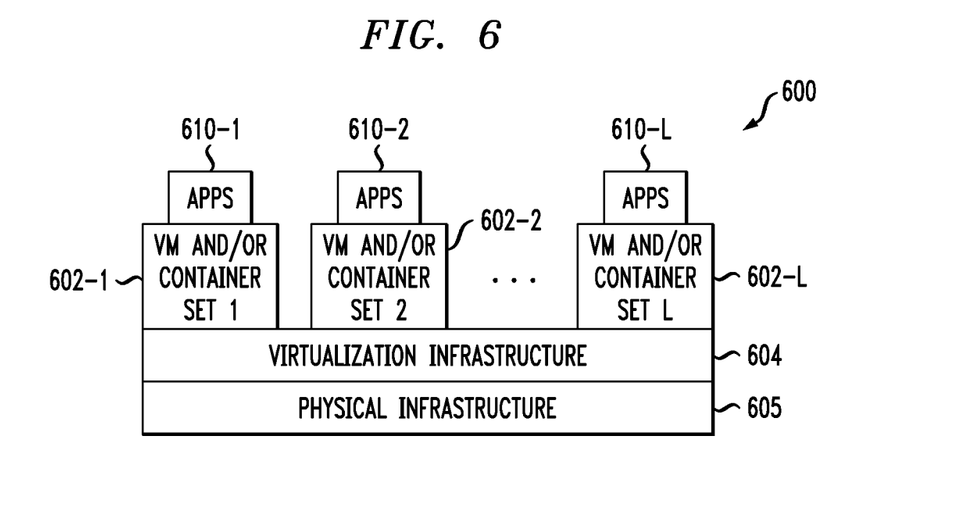
FIGS. 6 and 7 show examples of processing platforms that may be utilized to implement at least a portion of an information processing system in illustrative embodiments.
Figure 7:
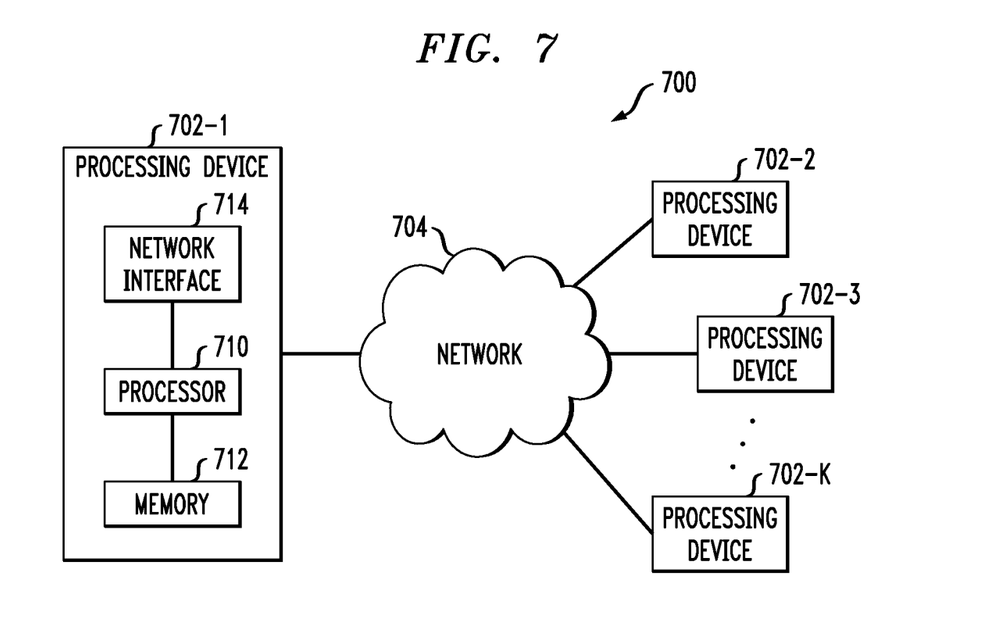

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide enriched data across various data structures. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   receiving, as input, a first data structure from a first data source and a second data structure from a second data source, wherein the first data structure is structured differently from the second data structure;
   normalizing the first data structure and the second data structure using one or more configuration files;
   identifying, from the normalized first data structure and second data structure using one or more machine learning techniques, one or more items of data in the second data structure that contain information relevant to one or more items of corresponding data in the first data structure, wherein the one or more items of corresponding data in the first data structure comprise one or more dynamically calculated values, and wherein the one or more items of identified data in the second data structure comprise one or more dynamically calculated sub-values contributing to at least one of the one or more dynamically calculated values in the corresponding data in the first data structure;
   generating a target data structure comprising at least a portion of the one or more items of identified data from the second data structure, and at least a portion of the one or more items of corresponding data from the first data structure; and
   generating a unique key in the target data structure, wherein the unique key is attributed to data linked between the portion of the one or more items of identified data from the second data structure and the portion of the one or more items of corresponding data from the first data structure;
   wherein the method is performed by at least one processing device comprising a processor coupled to a memory.

2. The computer-implemented method of claim 1, wherein the one or more items of identified data in the second data structure are not explicitly present in the first data structure.

3. The computer-implemented method of claim 1, wherein the one or more configuration files comprise one or more rules for parsing the first data structure and the second data structure.

4. The computer-implemented method of claim 3, wherein normalizing the first data structure and the second data structure comprises parsing each of the first data structure and the second data structure by applying the one or more rules.

5. The computer-implemented method of claim 1, wherein at least one of the first data structure and the second data structure is received as an extensible markup language file.

6. The computer-implemented method of claim 1, further comprising:
   accessing, via the target data structure, the portion of the one or more items of identified data from the second data structure and the portion of the one or more items of corresponding data from the first data structure using the unique key.

7. The computer-implemented method of claim 6, further comprising:
   causing the portion of the one or more items of identified data from the second data structure to be displayed within a user interface with the portion of the one or more items of corresponding data from the first data structure.

8. A non-transitory processor-readable storage medium having stored therein program code of one or more software programs, wherein the program code when executed by at least one processing device causes the at least one processing device:
   to receive, as input, a first data structure from a first data source and a second data structure from a second data source, wherein the first data structure is structured differently from the second data structure;
   to normalize the first data structure and second data structure using one or more configuration files;
   to identify, from the normalized first data structure and second data structure using one or more machine learning techniques, one or more items of data in the second data structure that contain information relevant to one or more items of corresponding data in the first data structure, wherein the one or more items of corresponding data in the first data structure comprise one or more dynamically calculated values, and wherein the one or more items of identified data in the second data structure comprise one or more dynamically calculated sub-values contributing to at least one of the one or more dynamically calculated values in the corresponding data in the first data structure;

to generate a target data structure comprising at least a portion of the one or more items of identified data from the second data structure, and at least a portion of the one or more items of corresponding data from the first data structure; and to generate a unique key in the target data structure, wherein the unique key is attributed to data linked between the portion of the one or more items of identified data from the second data structure and the portion of the one or more items of corresponding data from the first data structure.

9. The non-transitory processor-readable storage medium of claim 8, wherein the one or more items of identified data in the second data structure are not explicitly present in the first data structure.

10. The non-transitory processor-readable storage medium of claim 8, wherein the one or more configuration files comprise one or more rules for parsing the first data structure and the second data structure.

11. The non-transitory processor-readable storage medium of claim 10, wherein normalizing the first data structure and the second data structure comprises parsing each of the first data structure and the second data structure by applying the one or more rules.

12. The non-transitory processor-readable storage medium of claim 8, wherein at least one of the first data structure and the second data structure is received as an extensible markup language file.

13. The non-transitory processor-readable storage medium of claim 8, wherein the program code when executed by the at least one processing device causes the at least one processing device:

to access, via the target data structure, the portion of the one or more items of identified data from the second data structure and the portion of the one or more items of corresponding data from the first data structure using the unique key.

14. An apparatus comprising:

at least one processing device comprising a processor coupled to a memory;

the at least one processing device being configured:

to receive, as input, a first data structure from a first data source and a second data structure from a second data source, wherein the first data structure is structured differently from the second data structure;

to normalize the first data structure and second data structure using one or more configuration files;

to identify, from the normalized first data structure and second data structure using one or more machine learning techniques, one or more items of data in the second data structure that contain information relevant to one or more items of corresponding data in the first data structure, wherein the one or more items of corresponding data in the first data structure comprise one or more dynamically calculated values, and wherein the one or more items of identified data in the second data structure comprise one or more dynamically calculated sub-values contributing to at least one of the one or more dynamically calculated values in the corresponding data in the first data structure;

to generate a target data structure comprising at least a portion of the one or more items of identified data from the second data structure, and at least a portion of the one or more items of corresponding data from the first data structure; and to generate a unique key in the target data structure, wherein the unique key is attributed to data linked between the portion of the one or more items of identified data from the second data structure and the portion of the one or more items of corresponding data from the first data structure.

15. The apparatus of claim 14, wherein the one or more items of identified data in the second data structure are not explicitly present in the first data structure.

16. The apparatus of claim 14, wherein the one or more configuration files comprise one or more rules for parsing the first data structure and the second data structure.

17. The apparatus of claim 16, wherein normalizing the first data structure and the second data structure comprises parsing each of the first data structure and the second data structure by applying the one or more rules.

18. The apparatus of claim 14, wherein said normalization comprises parsing each of the first data structure and the second data structure by applying the one or more rules of the one or more configuration files.

19. The apparatus of claim 14, wherein the at least one processing device is further configured:

to access, via the target data structure, the portion of the one or more items of identified data from the second data structure and the portion of the one or more items of corresponding data from the first data structure using the unique key.

20. The apparatus of claim 19, wherein the at least one processing device is further configured:

to cause the portion of the one or more items of identified data from the second data structure to be displayed within a user interface with the portion of the one or more items of corresponding data from the first data structure.

\* \* \* \* \*